United States Patent [19]

Kassai

[11] Patent Number: 4,616,844
[45] Date of Patent: Oct. 14, 1986

[54] MECHANISM FOR LOCKING OPENED STATE OF BABY CARRIAGE

[75] Inventor: Kenzou Kassai, Osaka, Japan

[73] Assignee: Aprica Kassai Kabushikikaisha, Osaka, Japan

[21] Appl. No.: 626,110

[22] Filed: Jun. 28, 1984

[30] Foreign Application Priority Data

Jul. 15, 1983 [JP] Japan .......................... 58-110370[U]
Nov. 4, 1983 [JP] Japan ................. 58-207729

[51] Int. Cl.⁴ ............................................. B62B 7/08
[52] U.S. Cl. ............................ 280/650; 280/47.37 R; 280/47.38; 280/658; 403/93
[58] Field of Search .............. 280/656, 644, 643, 642, 280/647, 650, 658, 655, 47.37 R, 47.38; 403/92, 93, 96

[56] References Cited

U.S. PATENT DOCUMENTS 2,063,242 12/1936 Graser ................................. 280/644
4,216,974 8/1980 Kassai ................................. 280/650
4,317,581 3/1982 Kassai ................................. 280/658
4,428,598 1/1984 Kassai ................................. 280/644

Primary Examiner—John J. Love
Assistant Examiner—Eric D. Culbreth
Attorney, Agent, or Firm—W. G. Fasse; D. H. Kane, Jr.

[57] ABSTRACT

In both the opened and closed states of a baby carriage, the push rod-side engaging portion (35) of a lock operating member (29) engages either of the two engaging portions (20, 21) formed on a connecting rod (4), whereby each of the opened and closed states can be locked. For example, in the opened state, the push rod-side engaging portion (35) engages the opened state locking purpose connecting rod-side engaging portion (20) of the connecting rod (4), whereby the push rod (3) and connecting rod (4), which are now in their linear state, are maintained in this state, and since this engagement is forced by a spring (34), a reliable locked state can be obtained. Further, in the closed state, the push rod-side engaging portion (35) engages the closed state locking purpose connecting rod-side engaging portion (21) of the connecting rod (4), whereby the push rod (3) and connecting rod (4), which are now in their bent state, are maintained in this state, with the spring (34) ensuring that the locked state is reliable. When it is desired to cancel these locked states, this can be attained by sliding the lock operating member (29) upward.

6 Claims, 13 Drawing Figures

FIG.2
FIG.3
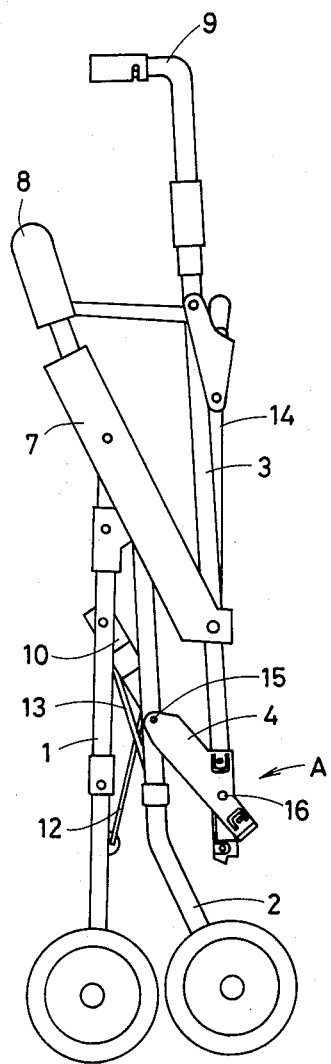
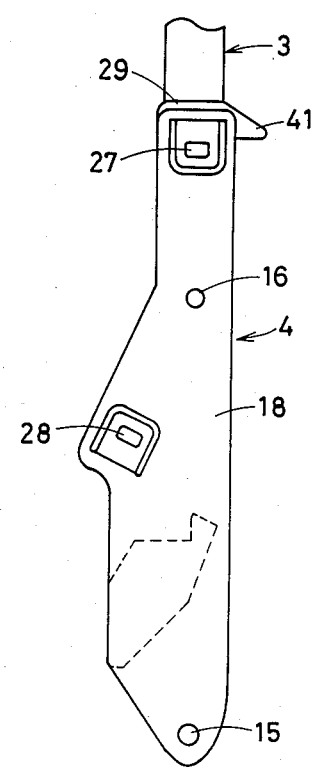

MECHANISM FOR LOCKING OPENED STATE OF BABY CARRIAGE

BACKGROUND OF THE INVENTION

This invention relates to a mechanism for locking the opened state or both the opened and closed states of a foldable baby carriage.

A foldable baby carriage is brought into the opened or closed state depending on circumstances. For example, the foldable baby carriage is in the opened state when moved with a baby placed therein. On the other hand, when it is carried without a baby placed therein, it is brought into the closed state.

The securement of the opened state of the baby carriage is important to the stabilization of its travel with a baby placed therein and to the enhancement of safety. Further, accidental opening of the baby carriage in its closed state makes carrying of the baby carriage in its closed state troublesome.

Thus, a suitable locking mechanism is required to make reliable both the closed and opened states of such foldable baby carriage. Such locking mechanisms will be constructed according to the respective types of baby carriages, and a foldable baby carriage to which the locking mechanism of this invention is applied includes at least the following arrangement. It has a pair of front legs, a pair of rear legs, a pair of push rods, and a pair of connecting rods pivotally connecting, each at its opposite ends, the respective rear legs and push rods. When the push rods and the associated connecting rods are straightened and fixed, the opened or unfolded state of the baby carriage is locked, while when the push rods and the associated connecting rods are folded and fixed, the closed state of the baby carriage is locked.

When such foldable baby carriage is arranged so that its opened or unfolded and closed or folded states can be locked, it is preferable from the standpoint of operability that the locking automatically take place at the end of movement from closed to opened state and at the end of movement from opened to closed state. On the other hand, when the opened state is to be changed to the closed state and the closed state to the opened state, it is desirable from the standpoint of safety that the locked state can be canceled only after a positive human manipulation.

SUMMARY OF THE INVENTION

An object of this invention is to provide an opened state locking mechanism simple in construction and superior in operability and safety, for use with a foldable baby carriage of the described type.

Another object of this invention is to provide a mechanism for locking the opened and closed states of a foldable baby carriage of the described type, which is simple in construction and superior in operability and safety and which is capable of locking both the opened and closed states by using a single common member.

This invention, as described above, is applied to a foldable baby carriage having a pair of front legs, a pair of rear legs, a pair of push rods, and a pair of connecting rods turnably connecting, each at its opposite ends, the respective rear legs and push rods. Each connecting rod is turnably connected at a first pivot point to the associated rear leg and at a second pivot point to the associated push rod. The second pivot point for connecting the push rod to the connecting rod is positioned a predetermined distance above the lower end of the push rod. Therefore, when the push rod and the connecting rod are straight in a state which corresponds to the opened state of the baby carriage, it follows that the push rod and the connecting rod overlap each other a predetermined distance. It is in this overlapping portion that the locking mechanism is formed. That is, the lower end of each push rod is provided with a lock operating member slidable in the direction of the length of the push rod. The lock operating member is constantly urged by a spring to slide toward the lower end of the push rod. The lower end of the lock operating member is formed with an engaging portion following an inclined guide portion. On the other hand, each connecting rod is formed with a hook portion following an inclined portion, said hook portion being adapted to engage said engaging portion when the lock operating member is in its lower end position. Further, in the slide movement of the lock operating member which is effected when cancelling the locking, more particularly, in the operation which is performed so that the lock operating member slides toward the upper end of the push rod against the force of the spring, the position of the lock operating member is temporarily retained, and for this purpose, the opposed surfaces of the connecting rod and lock operating member are formed with an engaging pawl and an engaging hole which are adapted to engage each other. When such engaging pawl and engaging hole engage each other, the lock operating member is fixed and prevented from sliding relative to the connecting rod and in this state the engagement of said engaging portion with said hook portion has been canceled.

According to the invention, in the opened state of the baby carriage, the engaging portion of each lock operating member engages the hook portion of the associated connecting rod to maintain the push rod and connecting rod in the straight or unfolded state, with the spring forcing them into this engagement; thus, a reliable locked open state can be obtained. Further, when it is desired to cancel such locked open state to bring the baby carriage into its opened closed state, the lock operating member is upwardly slid, whereupon the engaging pawl engages the engaging hole, with the result that the unlocked state is maintained; thus, there is no need for the operator to keep applying the force. Therefore, the operator is allowed to concentrate on the operation of bringing the baby carriage into its closed state. Further, when the baby carriage is to be changed from the closed to the opened state, the guide portion advantageously acts during such process to cause the engaging portion to automatically engage the hook portion, so that there is no need for a special operation for locking.

In a preferred embodiment of the invention, positioned on one end of each said connecting rod is a first pivot point for turnably connecting the associated rear leg. Positioned in substantially the middle of each connecting rod is a second pivot point for turnably connecting the associated push rod. The second pivot point is located a predetermined distance above the lower end of the push rod. As a result, when the push rod and the connecting rod are in the straight, unfolded state, they overlap each other said predetermined distance. Each push rod is provided, above the second pivot point, with a lock operating member slidable in the direction of the length of the push rod. Each lock operating member is constantly urged by a respective spring to slide toward the lower end of the associated push rod. The lower end of each lock operating member comprises a portion for engaging the respective connecting rod. Each connecting rod comprises a first open state latch member for engaging the respective engaging portion when the lock operating member is in its lower end position and in said straight state. Further, each connecting rod also comprises a second closed state latch member for engaging said engaging portion of the operating member when the lock operating member is in its lower end position and when the push rod and connecting rod are in their folded or closed state. At least, either the engaging portion or the first and second latch members are provided with inclined surfaces adapted to lead them into an automatic engagement against the force of the spring when they approach each other during the opening or closing movement of the baby carriage. Further, the surface of each lock operating member opposed to the associated connecting rod is formed with temporary engaging means, e.g., an engaging pawl. On the other hand, the surface of each connecting member opposed to the associated lock operating member is formed with an opened state unlocking engaging means, such as a hole and a closed state unlocking engaging means, such as a hole. The hole for locking the open state is positioned relative to said opened state locking connecting rod-like engaging portion. The hole for locking the closed state is positioned relative to said closed state locking connecting rod-side engaging portion. When the locking operating member is slid toward the upper end of the push rod against the force of said spring, said engaging pawl engages the opened state unlocking hole or the closed state unlocking hole. Thus, with the engaging portion of the locking member disengaged from the opened state latch or from the closed state latch, each lock operating member is temporarily fixed to prevent it from sliding relative to the associated connecting rod.

According to a preferred embodiment of this invention, in both the opened and closed states of the baby carriage, the engaging portion of the lock operating member engages one of the two latches on the connecting rod, so that both the opened and closed states can be locked. For example, in the opened state, the engaging portion of the locking member engages the respective latch of the connecting rod, and the push rod and connecting rod, which are now in the straight, unfolded state, are maintained in this state, under the force of the spring, so that a reliable locked open state is obtained. Further, in the closed state, the engaging portion of the locking member engages the respective latch of the connecting rod, and the push rod and connecting rod, which are now in the folded state, are maintained in this folded state, whereby the spring ensures a reliably locked closed state.

When it is desired to cancel these locked states, this can be attained by upwardly sliding each lock operating member. If the baby carriage is in the opened state, this operation allows the engaging pawl of the lock operating member to engage the opened state unlocking hole to temporarily maintain the unlocked state, so that there is no need for the operator to keep applying the force against the force of the spring. On the other hand, when it is desired to unlock the closed state, the lock operating member is upwardly slid, whereupon the engaging pawl engages the closed state unlocking hole, thereby maintaining the state in which the closed state is unlocked. As a result, the operator is allowed to concentrate on changing the baby carriage from the opened and closed state or from the closed to the opened state. Further, when the baby carriage is changed from the closed to the opened state and from the opened to the closed state, since in the course of these operations the inclined surfaces lead the push rod-side engaging portion and the connecting rod-side engaging portion into automatic engagement with each other, there is no special operation for locking.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a right-hand side view showing the closed state of the baby carriage of FIG. 1;

FIG. 3 is a view of the portion A of FIG. 1 showing a connecting portion between a push rod and a connecting rod, the view corresponding to the opened state of the baby carriage;

DESCRIPTION OF THE PREFERRED EMBODIMENTS

Figure 1:
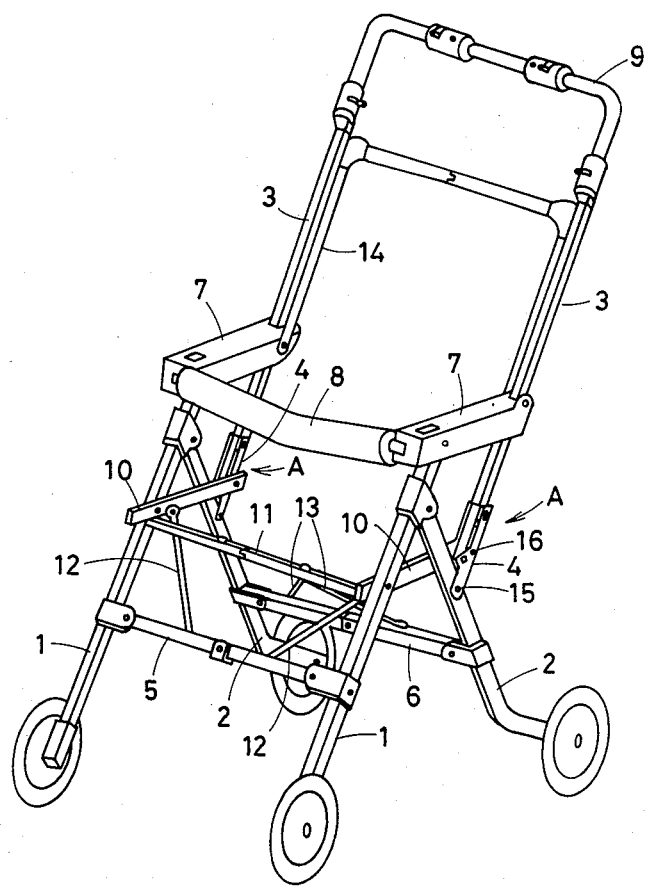
FIG. 1 is a perspective view showing the opened state of a baby carriage having an embodiment of this invention applied thereto.

A baby carriage opened and closed state locking mechanism according to an embodiment of this invention is attached to the baby carriage so as to lock both the opened state of FIG. 1 and the closed state of FIG. 2. The place of attachment is shown at A in FIGS. 1 and 2. Since an understanding of such locking mechanism necessitates a beforehand understanding of the arrangement of the baby carriage itself, the overall structure of the baby carriage will first be described.

Baby carriages of this type are disclosed in my U.S. Pat. No. 4,542,916, issued Sept. 24, 1985.

This baby carriage has a pair of front legs 1, a pair of rear legs 2, and a pair of connecting rods 4. The connecting rods 4 serve to connect, each at its opposite ends, the respective rear legs 2 and push rods 3.

As for another arrangement of the illustrated baby carriage, a foldable front leg connecting member 5 is connected at its opposite ends between the front legs 1 so that it is turnable relative to the front legs 1. Further, a foldable rear leg connecting member 6 is connected at its opposite ends between the rear legs 2 so that it is turnable relative to the rear legs 2. The rear legs 2 are turnably connected at their upper ends to the front legs 1. Handrails 7 are turnably connected at their front ends to the upper ends of the front legs 1 and at their rear ends to the push rods 3. A foldable torso guard 8 is turnably connected at its opposite ends between the handrails 7 so that it is turnably relative to the handrails 7. A foldable grip 9 is connected to its opposite ends between the upper ends of the push rods 3 so that it is turnable relative to the push rods 3. Longitudinal connecting members 10 are turnably connected at their front ends to the front legs 1 and at their rear ends to the connecting rods 4. A seat support member 11 which is foldable is connected at its opposite ends between the longitudinal connecting members 10 so that it is turnable relative to the longitudinal connecting members 10. Connecting rods 12 are operatively connected between the front leg connecting member 5 and the longitudinal connecting members 10 so that in the folding operation the movement of the longitudinal connecting members 10 is operatively associated with the folding of the front leg-connecting member 5. Further, connecting rods 13 are operatively connected between the rear leg connecting member 6 and the seat support member 11, whereby in the folding operation the folding of the rear leg connecting member 6 and the folding of the seat support member 11 are operatively associated with each other.

In addition, though not shown, the seat in the seat section of this baby carriage is formed between the longitudinal connecting members 10 and supported by the seat support member 11. The backrest of the seat section is held by a backrest holding member 14.

In such foldable baby carriage, when the opened state is changed to the closed state, the width dimension of the baby carriage is reduced, attended by the folding of the front leg connecting member 5, rear leg connecting member 6, torso guard 8, grip 9, and seat support member 11 while, as shown in FIG. 2, the front legs 1, rear legs 2, and push rods 3 are positioned substantially parallel to each other. In such folding movement, if attention is given to the movement of the portion A, it is seen that in the opened state, the push rods 3 and the respective connecting rods 4 are straight or in axial alignment relative to each other. And in the closed state, this alignment state is upset and the push rods 3 and the connecting rods 4 are mutually folded, for example, arranged in V-form.

In other words, when the opened state of the baby carriage is to be changed to the closed state, at least the aligned state of the push rod 3 and connecting rods 4 must be upset. Stated differently, so long as the aligned state of the push rods 3 and connection rod 4 is maintained, the baby carriage will not change to the closed state. Further, when the closed state is to be changed to the opened state, at least the disposition of the push rod 3 and connecting rod 4 which are now in the folded state must be upset. Therefore, in the closed state it follows that so far as the folded state of the push rod 3 and connecting rod 4 is maintained, the baby carriage will not change to the opened state.

Based on such principle, the embodiment of this invention provides a locking mechanism whereby in the opened state of the baby carriage the aligned state of the push rod 3 and connecting rod 4 is locked and in the closed state of the baby carriage the folded state of the push rod 3 and connecting rod 4 is locked.

The particulars of the locking mechanism will now be described with reference to FIGS. 3 to 12.

As is clear from the attitudes of the push rods 3 and connecting rods 4 shown in FIGS. 1 and 2, they change with the opening and closing movements of the baby carriage. However, in the locking mechanism to be described herein, the relative positional relation between the push rod 3 and the connecting rod 4 becomes a problem. For a clear understanding of such relative positional relation between the push rod 3 and the connecting rod 4, in FIGS. 3 et seq. the attitude of the push rod 3 is fixed so that it extends vertically, and the connecting rod 4 is shown in such relation with the push rod 3.

FIG. 3 is an external view showing the open state in which the push rod 3 and connecting rod 4 are connected. Positioned at the lower end of the connecting rod 4 is a first pivot pin 15 serving as a first pivot point for turnably connecting the rear leg 2. Positioned substantially in the middle of the connecting rod 4 is a second pivot pin 16 serving as a second pivot point for turnably connecting the push rod 3.

Figure 4:
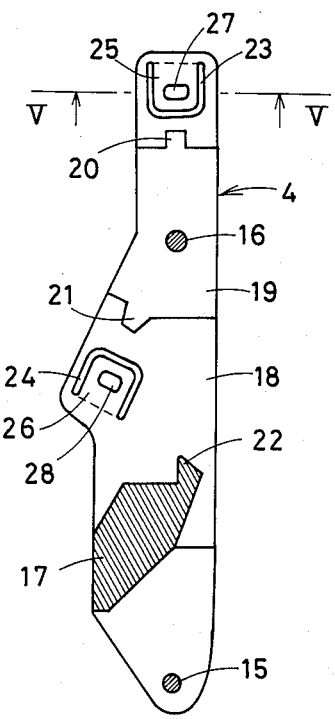
FIG. 4 is a longitudinal section of the connecting rod of FIG. 3.
Figure 5:
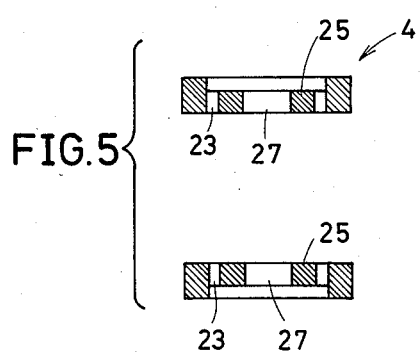
FIG. 5 is a section of the connecting rod taken along the line V—V of FIG. 4.

In FIG. 4, the connecting rod 4 alone is shown in longitudinal section, and in FIG. 5 a section taken along the line V—V of FIG. 4 is shown. As is clear from these figures, the connecting rod 4 has two parallel plates 18 spaced apart from each other by a spacer 17. Therefore, the push rod 3 shown in FIG. 3 is disposed between these two plates 18. The plates 18 are of symmetrical shape with respect to each other. Thus, there are a plate 18 appearing in FIG. 3 and a plate 18 appearing in FIG. 4, but the shape appearing on the plate 18 of FIG. 4 is also applied to the other plate 18.

The inner surface of each plate 18 of the connecting rod 4 has a raised portion 19 provided with an opened state locking latch 20 and a closed state locking latch 21. Further, the aforesaid spacer 17 of the connecting rod 4 has an auxiliary engaging portion 22. The connecting rod 4 also has two tongues 25 and 26 surrounded by U-shaped cuts 23 and 24. The tongues 25 and 26, as shown in FIG. 5 depicting the tongue 25, are thinner than the other portion. The tongues 25 and 26 are provided with an opened state unlocking engaging hole 27 and a closed state unlocking engaging hole 28, respectively.

Figure 6:
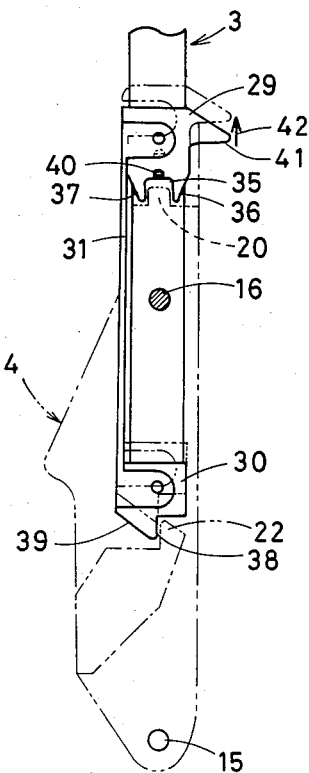
FIG. 6 shows the lower end portion of the push rod.

The lower end portion of the push rod 3 as shown in FIG. 6, is provided with a lock operating member 29 and an auxiliary lock member 30 which are slidable in the direction of the length of the push rod 3. The lock operating member 29 and auxiliary lock member 30 are connected together by a connecting plate 31 so that they move in the same direction.

Figure 7:
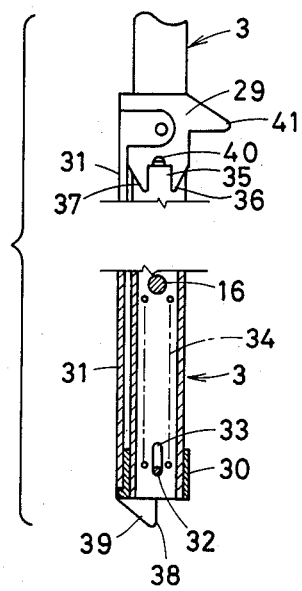
FIG. 7 shows, partly in section, the lower end portion of the push rod.

In FIG. 7, part of the push rod 3 and the auxiliary lock member 30 are shown in section to clarify the relation between the lock operating member 29 and auxiliary lock member 30 and the push rod 3. The auxiliary lock member 30 has a guide pin 32 attached thereto which extends through the push rod 3. The guide pin 32 is received in an elongated guide hole 33 formed in the push rod 3 to extend lengthwise of the push rod 3. Thus, the auxiliary lock member 30 is capable of sliding on the push rod 3 within the range in which the guide pin 32 can be moved in the elongated guide hole 33. The range of slide of the auxiliary lock member 30 is also the range of slide of the lock operating member 29. The push rod 3 is fabricated, e.g., of a pipe and houses a coiled compression spring 34. The compression spring 34 abuts at its ends against the second pivot pin 16 and the guide pin 32 to urge the auxiliary lock member 30 and hence the lock operating member 29 to slide toward the lower end of the push rod 3.

The lower end of the lock operating member 29 comprises an engaging portion 35 positioned between a pair of inclined surfaces 36 and 37, said portion 35 being paired, for engagement, with the aforesaid opened state locking latch 20 and with the closed state locking latch 21 of the connecting rod. The lower end of the auxiliary lock member 30 comprises an auxiliary engaging portion 38 for engaging the connecting rod and an inclined guide portion 39, said portion 38 being paired, for engagement, with the aforesaid auxiliary engaging portion 22 of the spacer 17 of the connecting rod 4.

Further, the surfaces of the lock operating member 29 opposed to the connecting rod 4, that is, the forward and backward surfaces thereof in FIGS. 6 and 7, comprise engaging pawls 40 for engaging the opened state unlocking engaging hole 27 or the closed state unlocking engaging hole 28 in said connecting rod 4. In addition, the lock operating member 29 is provided with an operating portion 41 projecting therefrom which, as shown in FIG. 3, even when the lower end portion of the push rod 3 is received in the connecting rod 4, projects beyond the connecting rod 4 to facilitate operation from the outside.

The operation and movement of the locking mechanism for the aforesaid push rod 3, connecting rod 4, lock operating member 29 and auxiliary lock member 30, will now be described.

FIGS. 3, 6 and 7 show the baby carriage locked in its opened state. The lock operating member 29 and auxiliary lock member 30 are downwardly slid by the compression spring 34, while the engaging portion 35 engages the latch 20 for locking the opened state. At the same time the auxiliary engaging portion 22 of the spacer 17 engages the portion 38 as best seen in FIG. 6. Therefore, the push rod 3 and the connecting rod 4, in this state, cannot be turned in either direction around the second pivot pin 16. That is, the push rod 3 and connecting rod 4 are locked in the straight, axially aligned state.

Figure 8:
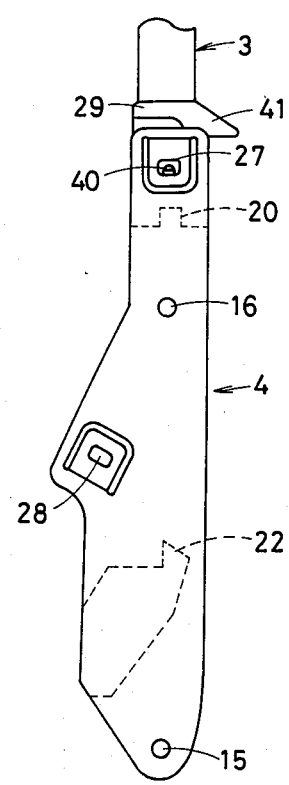
FIG. 8 shows the unlocked state in the opened state of the baby carriage.
Figure 9:
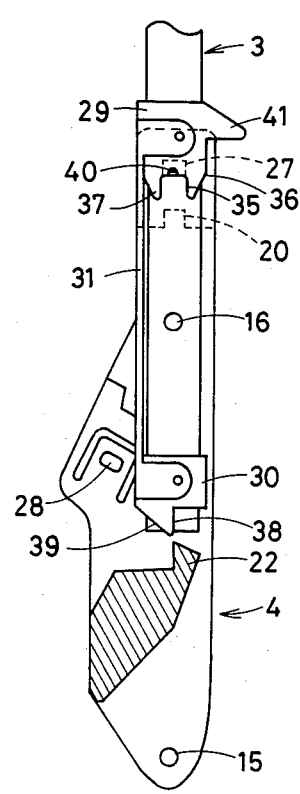
FIG. 9 shows the state of FIG. 8 partly in section.

If said lock is canceled, the baby carriage is allowed to change from the opened to the closed state. To effect such unlocking, the operator pulls up the lock operating member 41 by the finger in the direction of arrow 42 shown in FIG. 6 against the force of the compression spring 34. In response to this pull-up, each pawl 40, as shown in FIGS. 8 and 9, engages the opened state unlocking purpose engaging hole 27, whereby the lock operating member 29 and auxiliary lock member 30 are temporarily maintained in this state in spite of the action of the compression spring 34. When the engaging pawl 40 engages the opened state unlocking engaging hole 27, the engaging portion 35 of the lock operating member 29 is disengaged from the opened state locking latch 20 while the auxiliary engaging portion 38 of the auxiliary lock member 30 is disengaged from the auxiliary engaging portion 22. Therefore, the connecting rod 4 is now allowed to turn around the second pivot pin 16 relative to the push rod 3. This turning movement allows relative movement of the push rod 3 and connecting rod 4 in the course of change from the opened to the closed state of the baby carriage as described above.

Figure 10:
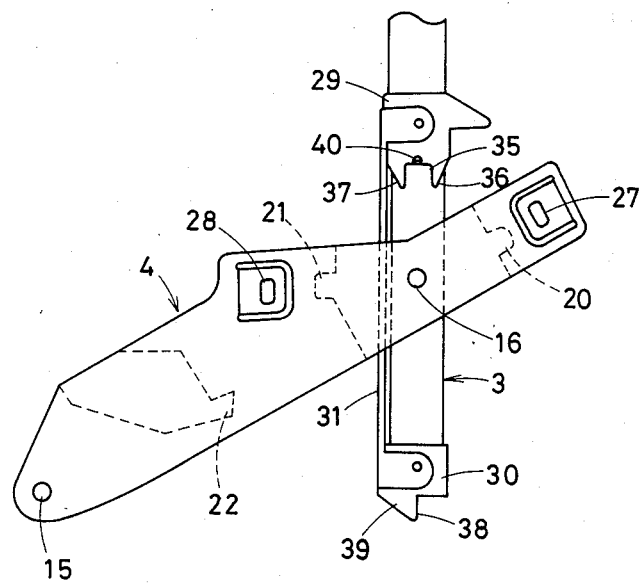
FIG. 10 shows an intermediate state between the opened and closed states of the baby carriage.

FIG. 10 shows an intermediate state with the connecting rod turned clockwise around the second pivot pin 16, the baby carriage changing from the opened to closed state. During the change from the state of FIGS. 8 and 9 to the state of FIG. 10, the engaging pawl 40 escapes from the opened state unlocking engaging hole 27. Upon completion of this escape, the lock operating member 29 and auxiliary lock member 30 are moved toward the lower end of the push rod 3 by the action of the spring 34.

As the state of FIG. 10 further progresses, the baby carriage comes close to completing its change to the closed state, whereupon the closed state locking latch 21 contacts the inclined surface 37 of the lock operating member 29. In this contacted state, with the closed state locking latch 21 and the inclined surface 37 sliding along each other, the lock operating member 29 and the auxiliary lock member 30 are slid on the push rod 3 against the force of the compression spring 34. When the closed state locking latch 21 reaches the end of the inclined surface 37, the lock operating member 29 and auxiliary lock member 30 are downwardly slid by the action of the compression spring 34, establishing the state in which the engaging portion 35 engages the closed state locking latch 21. This state is shown in FIGS. 11 and 12 and corresponds to the state in which the baby carriage is locked in its closed state.

Figure 11:
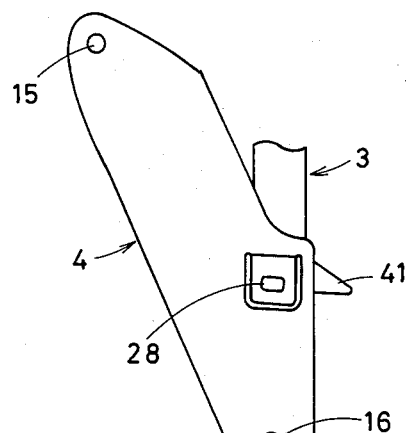
FIG. 11 shows the locked state in the closed state of the baby carriage.
Figure 12:
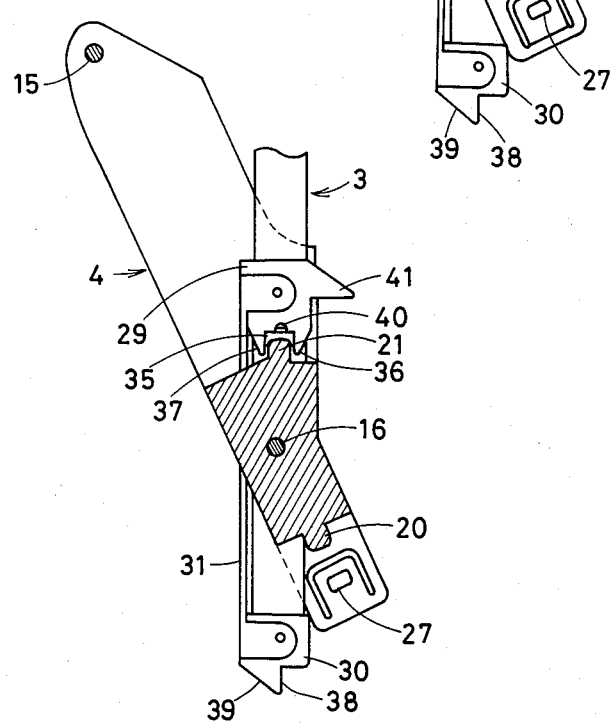
FIG. 12 shows the state of FIG. 11 partly in section.

In the state shown in FIGS. 11 and 12, the push rod 3 and the connecting rod 4 are prevented from turning around the second pivot pin 16 relative to each other. That is, the push rod 3 and the connecting rod 4 are locked in the folded, closed state.

To change the baby carriage from the closed to the opened state, the aforesaid lock must be canceled. To effect such unlocking, the operator pulls up the operating portion 41 of the lock operating member 29 and auxiliary lock member 30 against the force of the compression spring 34. In response thereto, the engaging pawl 40 engages the closed state unlocking engaging hole 28 in an unillustrated manner, whereby the lock operating member 29 and auxiliary lock member 30 are temporarily maintained in this state in spite of the action of the compression spring 34. At this time, the engaging portion 35 is in the state disengaged from the closed state locking latch 21. Therefore, the connecting rod 4 is allowed to turn counterclockwise around the second pivot pin 16 relative to the push rod 3. This turning allows the relative movement of the push rod 3 and connecting rod 4 in the course of change of the baby carriage from closed to opened state as described above.

In response to the aforesaid counterclockwise turning of the connecting rod 4, the state shown in FIG. 10 is reestablished, and as the turning further progresses, the inclined surface 36 of the lock operating member 29 contacts the opened state locking latch 20 of the connecting rod 4 while the guide portion 39 of the auxiliary lock member 30 contacts the auxiliary engaging portion 22 of the connecting rod 4. In this contacted state, the lock operating member 29 and auxiliary lock member 30 are slid on the push rod 3 against the force of the compression spring 34. When the opened state locking latch 20 reaches the end of the inclined surface 36 and the auxiliary engaging portion 22 reaches the end of the guide portion 39, the lock operating member 29 and auxiliary lock member 30 are downwardly slid by the action of the compression spring 34, whereby the engaging portion 35 engages the opened state locking latch 20 while the auxiliary engaging portion 38 engages the auxiliary engaging portion 22. That is, also at the end of the change of the baby carriage from closed to opened state, a locked state is automatically established.

The invention has so far been described with reference to the illustrated embodiment, but modifications thereof are possible.

For example, while the illustrated embodiment is provided with the auxiliary lock member 30 connected to the lock operating member 29 through the connecting plate 31 and with the engaging portion 22 associated therewith, this provision is made purely for auxiliary purposes and even in the opened state a sufficient locked state can be obtained so long as the engaging portion 35 of the lock operating member 29 and the opened state locking latch 20 of the connecting rod 4 are present. Therefore, even if the auxiliary lock member 30 and the auxiliary engaging portion 22 are absent, the mechanism functions sufficiently.

Further, while the connecting rod 4 has been made of two plates 18, it may be made of a single plate.

Further, while the inclined surfaces 36 and 37 enabling automatic engagement have been provided in connection with the engaging portion 35, such inclined surfaces may be provided on the opened state lock latch 20 and on the closed state locking latch 21 or they may be provided on both of them.

Further, in the illustrated embodiment, the opened state unlocking engaging hole 27 and closed state unlocking engaging hole 28 have been positioned on the thin tongues 25 and 26. While this arrangement allows smooth engagement of the engaging pawl 40 with the engaging holes 27 and 28, if such advantage is not desired, there is no need to place these holes in thin tongues.

Figure 13:
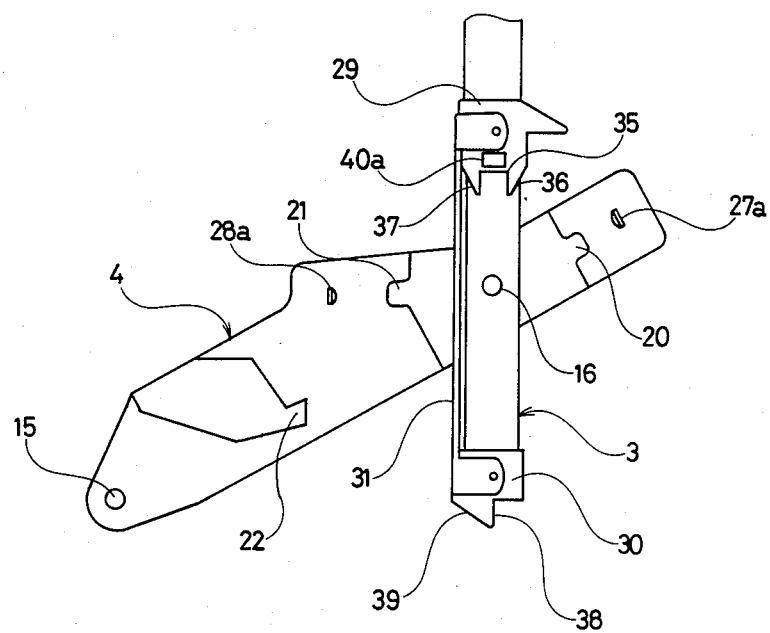
FIG. 13 is a view similar to FIG. 10, but showing a modification of the connecting portion between the push rod and the connecting rod.
Figure 14:
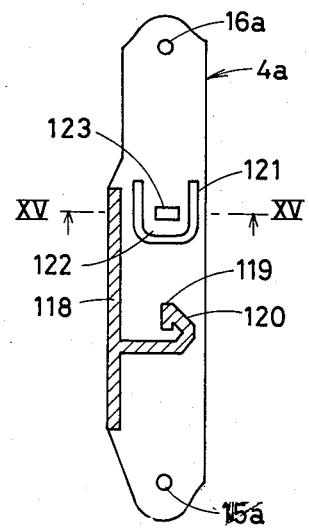
Figure 15:
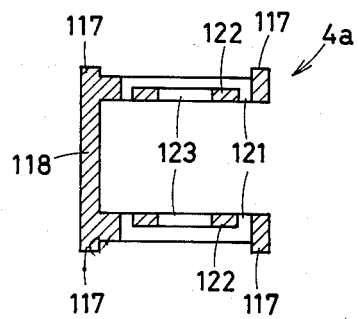
Figure 16:
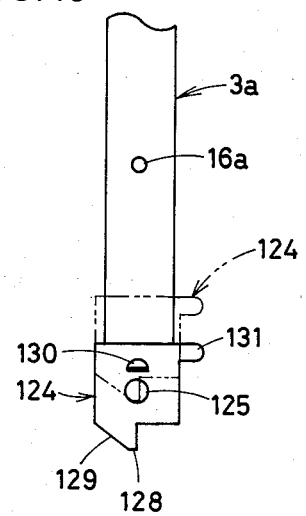
Figure 17:
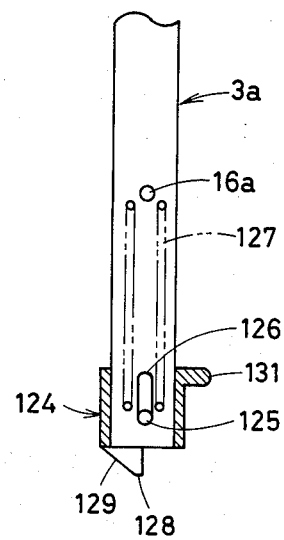
Figure 18:
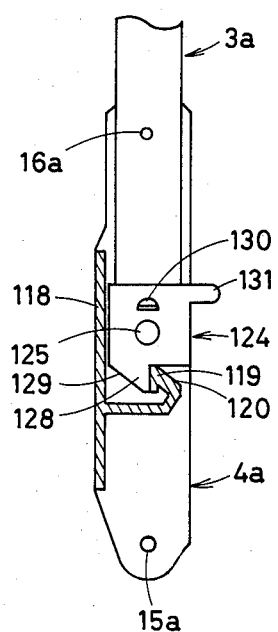
Figure 19:
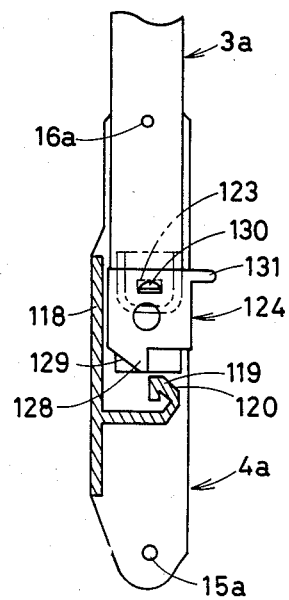
Figure 20:
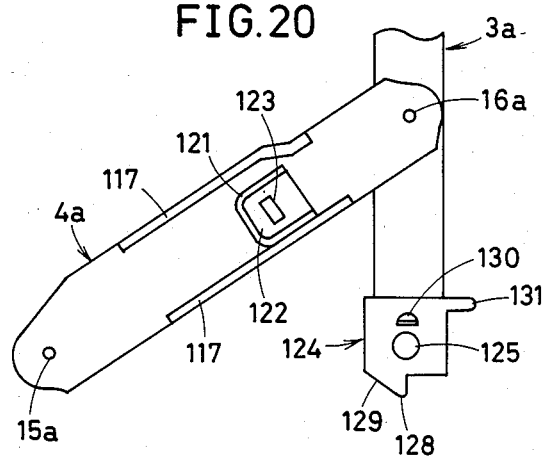

Further, in the above described embodiment, although the engaging holes 27 and 28 have been formed in the connecting rod 4 and the engaging pawls 40 have been formed on the lock operating member 29, reversely, the engaging holes may be formed in the lock operating member 29 and the engaging pawls 27a and 28a may be provided on the connecting rod 4, as shown in FIG. 13.

Although the present invention has been described and illustrated in detail, it is clearly understood that the same is by way of illustration and example only and is not to be taken by way of limitation, the scope of the present invention being limited only by the terms of the appended claims.

What is claimed is:

1. In a mechanism for locking the open and closed states of a foldable baby carriage having a pair of front legs (1), a pair of rear legs (2), a pair of push rods (3), and a pair of connecting rods (4) for turnably connecting, each at its opposite ends, the respective rear legs (2) and push rods (3), wherein an unfolded state of the baby carriage is locked when said push rods (3) and said connecting rods (4) associated therewith are in their straight state, while the folded state of the baby carriage is locked when said push rods (3) and said connecting rods (4) associated therewith in their folded position, the improvement comprising a first pivot point (15) located on one end of each said connecting rods (4) for turnably connecting each of said rear legs (2) to its respective connecting rod, a second pivot point (16) positioned substantially in the middle of each of said connecting rods (4) for turnably connecting each of said push rods (2) to its respective connecting rod, said second pivot point (16) being positioned a predetermined distance above the lower end of each push rod (3), so that in said unfolded state each of said push rods (3) and each of said connecting rods (4) overlap each other along said predetermined distance, wherein each of said push rods (3) comprises a lock operating member (29) positioned above said second pivot point (16) so that it is slidable in the direction of the length of the respective push rod, spring means (34) for constantly urging each lock operating member toward the lower end of the push rod (3), the lower end of each lock operating member (29) comprising a portion (35) for engaging said connecting rods, each of said connecting rods (4) comprising a first open state latch member (20) for cooperation with said engaging portion (35) when said lock operating member (29) is in its lower end position and in said unfolded state, and a closed state second latch member (21) for cooperation with said engaging portion (35) when said lock operating member (29) is in its lower end position and in said folded state, at least either said engaging portion (35) or said first and second latch members (20, 21) comprising inclined surfaces (36, 37) for leading the respective portion or member into automatic engagement against the force of said spring means (34) when they approach each other in the course of the opening and closing movements of said baby carriage, each of said lock operating members (29) having a first surface comprising temporary engaging means (40) opposed to the respective connecting rod (4) for temporary engagement with a second surface of the respective connecting rod; said second surface of each of said connecting rods (4) comprising unlocking and locking engaging means (27, 28) corresponding to said opened and closed states for cooperation with first and second latch members (20, 21), whereby when said lock operating member (29) slides on said push rod (3) toward the upper end of the push rod (3) against the force of said spring means (34), said temporary engaging means (40) engages said open or closed state engaging means (27 or 28) and said engaging portion disengages from said first or second latch members (20, 21), and wherein each of said lock operating members (29) is temporarily fixed for preventing sliding relative to each of said connecting rods (4).

2. The mechanism of claim 1, wherein said connecting rod (4) has two plates (18) disposed to hold said push rod (3).

3. The mechanism of claim 1, wherein said unlocking engaging means (27, 28) are formed in thin tongues (25, 26) forming part of said connecting rod (4).

4. The mechanism of claim 1, wherein the lower end of each of said push rods (3) is provided with an auxiliary lock member (30) so that it is slidable together with said lock operating member (29) in the direction of the length of the push rod (3), the lower end of each said lock member (30) comprising a push rod-side engaging portion (38), and wherein each of said connecting rods (4) comprises an auxiliary engaging portion (22) for engaging said push rod-side auxiliary engaging portion when said auxiliary lock member (30) is in its lower end position and when said connecting rod is in said unfolded state.

5. The mechanism of claim 1, wherein said temporary engaging means includes an engaging pawl (40), and wherein both of said unlocking engaging means include engaging holes (27, 28).

6. The mechanism of claim 1, wherein said temporary engaging means includes an engaging holes (40a), and wherein both of said unlocking engaging means include engaging pawls (27a, 28a).

* * * * *